(12) United States Patent  
Yoon et al.

(10) Patent No.: US 9,570,022 B2
(45) Date of Patent: Feb. 14, 2017

(54) LIQUID CRYSTAL DISPLAY DEVICE

(71) Applicant: Samsung Display Co. Ltd., Yongin (KR)

(72) Inventors: Young Soo Yoon, Seoul (KR); Joon Chul Goh, Hwaseong-si (KR); Jung Taek Kim, Seoul (KR); Kyoung Ho Lim, Yongin-si (KR); Dae Gwang Jang, Incheon (KR)

(73) Assignee: SAMSUNG DISPLAY CO. LTD. (KR)

( * ) Notice: Subject to any disclaimer, the term of this patent is extended or adjusted under 35 U.S.C. 154(b) by 34 days.

(21) Appl. No.: 14/209,650

(22) Filed: Mar. 13, 2014

(65) Prior Publication Data

US 2015/0070608 A1  Mar. 12, 2015

(30) Foreign Application Priority Data

Sep. 6, 2013  (KR) .................. 10-2013-0107307

(51) Int. Cl.
  *G02F 1/1343* (2006.01)
  *G02F 1/13357* (2006.01)
  *G09G 3/36* (2006.01)
  *F21V 8/00* (2006.01)

(52) U.S. Cl.
  CPC ........... *G09G 3/3655* (2013.01); *G02B 6/0036* (2013.01); *G02B 6/0061* (2013.01)

(58) Field of Classification Search
  None
  See application file for complete search history.

(56) References Cited

U.S. PATENT DOCUMENTS

| | | | | |
|---|---|---|---|---|
| 2002/0063669 | A1* | 5/2002 | Yanagi | G09G 3/3648 345/87 |
| 2002/0196220 | A1* | 12/2002 | Sato | G09G 3/342 345/87 |
| 2006/0285185 | A1* | 12/2006 | Choi | G02B 6/0038 359/15 |
| 2007/0229447 | A1 | 10/2007 | Takahara et al. | |
| 2009/0102992 | A1* | 4/2009 | Chung | G09G 3/3648 349/37 |
| 2009/0231467 | A1* | 9/2009 | Yamashita | G03B 7/091 348/234 |
| 2010/0079429 | A1 | 4/2010 | Hirose et al. | |
| 2010/0110063 | A1 | 5/2010 | Okazaki et al. | |
| 2010/0182541 | A1* | 7/2010 | Ouchi | G02F 1/133615 349/65 |
| 2010/0277406 | A1 | 11/2010 | Choi et al. | |
| 2011/0037785 | A1* | 2/2011 | Shiomi | G09G 3/3426 345/690 |

(Continued)

FOREIGN PATENT DOCUMENTS

| | | |
|---|---|---|
| JP | 2002-175059 | 6/2002 |
| KR | 1020120032896 | 4/2012 |

*Primary Examiner* — Ryan Crockett
(74) *Attorney, Agent, or Firm* — Cantor Colburn LLP

(57) ABSTRACT

A liquid crystal display device includes a liquid crystal panel of a normally black type which receives a plurality of scan signals and a common voltage having a voltage level which periodically varies, and a backlight unit which provides backlight to the liquid crystal panel, where the plurality of scan signals sequentially has a scan-on voltage along a first direction, and the backlight has a luminance which is increased or decreased along the first direction.

9 Claims, 10 Drawing Sheets

(56) References Cited

U.S. PATENT DOCUMENTS

| | | | |
|---|---|---|---|
| 2011/0043547 A1* | 2/2011 | Nonaka | G09G 3/3426 345/690 |
| 2011/0096084 A1* | 4/2011 | Hu | G09G 3/3413 345/589 |
| 2011/0106443 A1* | 5/2011 | Ogawa | G01C 21/3632 701/532 |
| 2011/0128279 A1* | 6/2011 | Lee | G09G 3/3648 345/212 |
| 2011/0234564 A1* | 9/2011 | Kim | G09G 3/3655 345/211 |
| 2011/0234566 A1* | 9/2011 | Asano | G09G 3/3426 345/211 |
| 2013/0021824 A1* | 1/2013 | Chang | G02B 6/0061 362/623 |

\* cited by examiner

LIQUID CRYSTAL DISPLAY DEVICE

This application claims priority to Korean Patent Application No. 10-2013-0107307, filed on Sep. 6, 2013, and all the benefits accruing therefrom under 35 U.S.C. §119, the content of which in its entirety is herein incorporated by reference.

BACKGROUND

1. Field

Exemplary embodiments of the invention relate to a liquid crystal display device, and more particularly to a liquid crystal display device, in which a common voltage is periodically varied.

2. Description of the Prior Art

A liquid crystal display device typically includes a liquid crystal layer having liquid crystal particles. In such a liquid crystal display device, as an electric field that is applied to a liquid crystal layer is changed, alignment of liquid crystal particles is changed, and light transmittance of the liquid crystal layer is changed based on the change of the alignment of the liquid crystal particles. When the light transmittance of the liquid crystal layer is controlled through adjustment of the strength of the electric field that is applied to the liquid crystal layer, an image corresponding to the electric field may be displayed.

A liquid crystal display device may include a common electrode and a pixel electrode to generate an electric field in a liquid crystal layer. The strength of the electric field applied to the liquid crystal layer may be varied corresponding to the electric potential difference between the common electrode and the pixel electrode. The common electrode may be commonly provided through a plurality of pixels to provide a common voltage to the plurality of pixels. The pixel electrode may be provided for each of the plurality of pixels, and a voltage corresponding to an image that is displayed on the liquid crystal display device may be applied to the pixel electrode. In such a liquid crystal display device, when the electric potential difference between the common electrode and the pixel electrode are constantly maintained in a same polarity for a long period of time, the performance of the liquid crystal layer may be deteriorated. Accordingly, the liquid crystal display device may be driven in a polarity inversion driving method that periodically inverts the polarity of the electric potential difference between the common electrode and the pixel electrode to effectively prevent such a performance deterioration of the liquid crystal layer.

In a liquid crystal display device, when the voltage of the pixel electrode higher than the voltage of the common electrode corresponds to "positive polarity" and a the voltage of the pixel electrode lower than the voltage of the common electrode corresponds to "negative polarity", the common voltage that is applied to the common electrode may be continuously varied to reduce power consumption of the liquid crystal display device during the polarity inversion driving of the liquid crystal display device. For example, when the common voltage is changed to allow the common voltage of the positive polarity to become lower than the common voltage of the negative polarity, the difference between the maximum value of the voltage that may be applied to a pixel electrode in a positive polarity state and the minimum value of the voltage that may be applied to the pixel electrode in a negative polarity state may be reduced such that the range of the voltage that is applied to the pixel electrode may be decreased, and thus the power consumption of the liquid crystal display device may also be decreased.

SUMMARY

In a liquid crystal display device, if the common voltage that is applied to the common electrode is varied, the voltage that is applied to the pixel electrode by means of the capacitance between the common electrode and the pixel electrode may be varied corresponding to the common electrode. If the voltage that is applied to the pixel electrode is varied, the electric potential difference between the gate of a thin film transistor for applying the voltage to the pixel electrode and the pixel electrode is changed, and thus leakage current may occur in the thin film transistor. If the leakage current occurs in the thin film transistor, the voltage that is applied to the pixel electrode is changed, and thus the electric potential difference between the common electrode and the pixel electrode is unable to be maintained. Accordingly, the display quality of the liquid crystal display device may be deteriorated.

Accordingly, exemplary embodiments of the invention relate to a liquid crystal display device which may effectively prevent display quality of the liquid crystal display device from deteriorating when the common voltage thereof is varied.

Additional features of the invention will be set forth in part in the description which follows and in part will become apparent to those having ordinary skill in the art upon examination of the following or may be learned from practice of the invention.

However, the invention is not restricted to exemplary embodiments set forth herein. The above and other features of the invention will become more apparent to one of ordinary skill in the art to which the invention pertains by referencing the detailed description of the invention given below.

In an exemplary embodiment, a liquid crystal display device includes: a liquid crystal panel of a normally black type which receives a plurality of scan signals and receives a common voltage having a voltage level, which periodically varies; and a backlight unit which provides backlight to the liquid crystal panel, where the plurality of scan signals has a scan-on voltage sequentially along a first direction, and the backlight has a luminance which is increased along the first direction.

In another exemplary embodiment, a liquid crystal display device includes: a liquid crystal panel of a normally white type which receives a plurality of scan signals and receives a common voltage having a voltage level, which periodically varies; and a backlight unit which provides backlight to the liquid crystal panel, where the plurality of scan signals sequentially have a scan-on voltage along a first direction, and the backlight has a luminance which is decreased along the first direction.

According to exemplary embodiments of the invention, the display quality of the liquid crystal display device may be improved by compensating luminance of the liquid crystal display device to be substantially uniform.

BRIEF DESCRIPTION OF THE DRAWINGS

The above and features of the invention will be more apparent from the following detailed description taken in conjunction with the accompanying drawings, in which.

DETAILED DESCRIPTION

Figure 1:
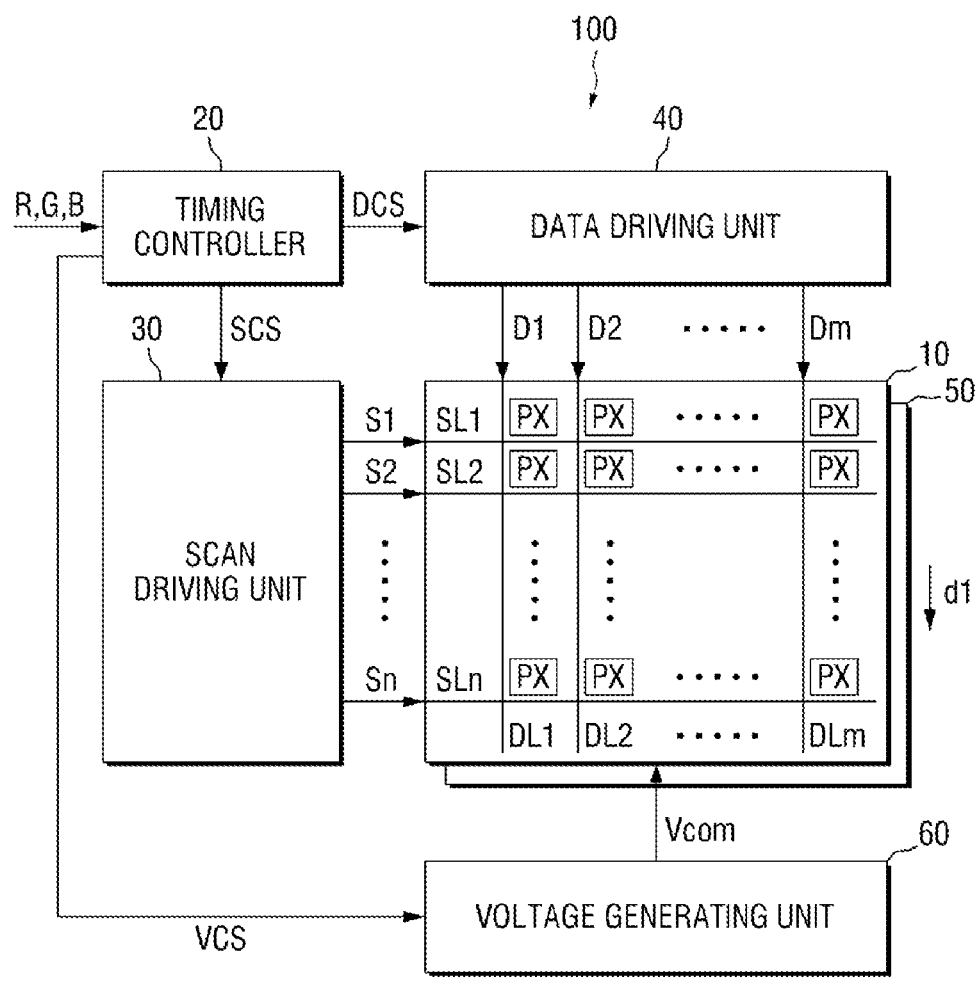
FIG. 1 is a block diagram showing an exemplary embodiment of a liquid crystal display device, according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on," another element or layer, it can be directly on the other element or layer or intervening elements or layers may be present. In contrast, when an element is referred to as being "directly on" another element or layer, there are no intervening elements or layers present.

Spatially relative terms, such as "below," "beneath," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the invention are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in detail with reference to the accompanying drawings.

FIG. 1 is a block diagram showing an exemplary embodiment of a liquid crystal display device, according to the invention. Referring to FIG. 1, an exemplary embodiment of a liquid crystal display device 100 includes a liquid crystal panel 10 and a backlight unit 50.

In such an embodiment, the liquid crystal panel 10 may include a liquid crystal layer (not shown) having a plurality of liquid crystal particles, and an image may be displayed through controlling the light transmittance of the liquid crystal layer. The liquid crystal panel 10 may be a normally black type liquid crystal panel. Herein, the normally black type liquid crystal panel means a liquid crystal panel, on which black is displayed due to low light transmittance of the liquid crystal layer when the electric field is not applied to the liquid crystal layer.

The liquid crystal panel 10 may be driven in a polarity inversion driving method. In an exemplary embodiment, where the liquid crystal panel 10 is driven in the polarity inversion driving method, the electric field that is applied to the liquid crystal layer is prevented from being maintained only in one direction, and thus the performance deterioration of the liquid crystal layer may be effectively prevented.

A plurality of scan signals S1 to Sn may be provided to the liquid crystal panel 10 through a plurality of scan signal lines SL1 to SLn. The plurality of scan signals S1 to Sn may be transferred sequentially in a first direction d1. Each of the plurality of scan signals S1 to Sn may be transferred to at least one of a plurality of pixels PX, which will be described later in detail, and each of the plurality of pixels PX may selectively receive one of a plurality of data signal D1 to Dm through a plurality of data lines DL1 to DLm in response to the plurality of scan signals S1 to Sn transferred thereto. Herein, each of 'n' and 'm' are a natural number.

The liquid crystal panel 10 may include the plurality of pixels PX. The plurality of pixels PX may be arranged substantially in a matrix form, but are not limited thereto. Each of the plurality of the pixels PX may be a minimum unit for displaying an image on the liquid crystal panel 10.

The backlight unit 50 may provide light (hereinafter, "backlight") to the liquid crystal panel 10. The backlight from the backlight unit 50 may be transmitted through the liquid crystal panel 10 based on the light transmittance of the liquid crystal panel 10, and may be visually recognized to an outside as an image. The backlight unit 50 may be arranged on a lower portion of the liquid crystal panel 10 to overlap the liquid crystal panel 10.

Figure 2:
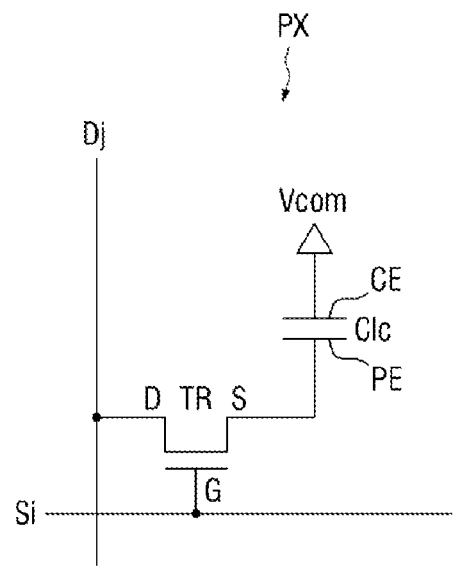
FIG. 2 is a circuit diagram showing an exemplary embodiment of a pixel in FIG. 1.

Hereinafter, referring to FIG. 2, a pixel PX will be described in greater detail. FIG. 2 is a circuit diagram of an exemplary embodiment of a pixel in FIG. 1.

Referring to FIG. 2, an exemplary embodiment of a pixel PX may include a thin film transistor TR and a liquid crystal capacitor Clc. In such an embodiment, the pixel PX may be a pixel connected to an i-th scan line SLi and a j-th data line DLj, and an i-th scan signal S1 may be provided to a gate G of the thin film transistor TR. A source S of the thin film transistor TR may be connected to the liquid crystal capacitor Clc, and the j-th data voltage may be applied to a drain D of the thin film transistor TR. The source S and the drain D of the thin film transistor TR may be changed to each other. Here, T is a natural number equal to or less than 'n', and 'j' is a natural number equal to or less than 'm'. When the i-th scan signal S1 is a scan-on signal Vson, which will be described later, the thin film transistor TR may be turned on such that a voltage that corresponds to the j-th data voltage Dj is charged in the liquid crystal capacitor Clc. When the i-th scan signal S1 is a scan-off signal Vsoff, which will be described later, the thin film transistor TR may be turned off such that the voltage that is charged in the liquid crystal capacitor Clc is maintained.

The liquid crystal capacitor Clc may include a common electrode CE and a pixel electrode PE. The common electrode CE may be commonly provided to correspond to two pixels among the plurality of pixels PX. The common electrode CE may be commonly provided to correspond to all of the plurality of pixels PX, but is not limited thereto. A common voltage Vcom may be applied to the common electrode CE. The pixel electrode PE may be independently provided in each of the plurality of pixels PX. The pixel electrode PE may be connected to the source S of the thin film transistor TR. When the thin film transistor TR is turned on, the j-th data voltage Dj may be applied to the pixel electrode PE. The light transmittance of the liquid crystal panel 10 may be controlled to correspond to voltages applied to the common electrode CE and the pixel electrode PE.

Hereinafter, referring to FIG. 3, the plurality of scan signals S1 to Sn and the common voltage Vcom will be described in greater detail.

Figure 3:
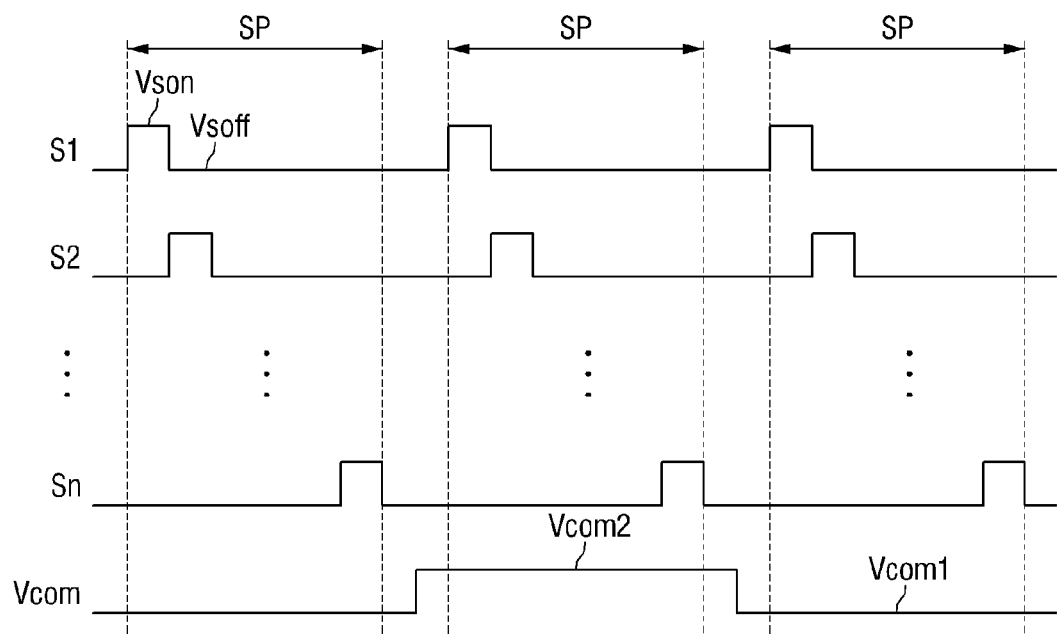
FIG. 3 is a signal timing diagram of first to n-th scan signals and a common voltage in an exemplary embodiment of a liquid crystal display device, according to the invention.

FIG. 3 is a signal timing diagram of the first to n-th scan signals and the common voltage Vcom in an exemplary embodiment of a liquid crystal display device, according to the invention. Referring to FIG. 3, each of the first to n-th scan signals S1 to Sn may be in a period when the scan signal has the scan-on voltage Vson and a period when the scan signal has the scan-off voltage Vsoff. In one frame, during which an image is displayed on the liquid crystal panel 10, each of the first to n-th scan signals S1 to Sn may have the scan-on voltage Vson once. The first to n-th scan signals S1 to Sn may sequentially have the scan-on voltage Vson, that is, the plurality of scan signals S1 to Sn may sequentially have the scan-on voltage Vson along the first direction d1. The one frame, during which the plurality of scan signals S1 to Sn sequentially have the scan-on voltage Vson once in the first direction may be referred to as a scan period SP.

The common voltage Vcom may have a voltage value that is repeatedly changed. In an exemplary embodiment, as shown in FIG. 3, the common voltage Vcom may be changed every frame, but not being limited thereto. In an alternative exemplary embodiment, the common voltage Vcom may be repeatedly changed every two or more frames, for example. The common voltage Vcom may have an electric potential of a first common voltage Vcom1 or a second common voltage Vcom2. In an exemplary embodiment, as shown in FIG. 3, the first common voltage Vcom1 may be lower than the second common voltage Vcom2. When the common voltage Vcom is the first common voltage Vcom1, the plurality of pixels PX of the liquid crystal panel 10 may be in a positive polarity state. When plurality of pixels PX of the liquid crystal panel 10 has a positive polarity and the plurality of scan voltages S1 to Sn has the scan-on voltage Vson, the plurality of data voltages D1 to Dm transferred to the pixel electrode PE may be increased. When the common voltage Vcom is the second common voltage Vcom2, the plurality of pixels PX of the liquid crystal panel 10 may be in a negative polarity state.

When the plurality of pixels PX of the liquid crystal panel 10 has a negative polarity and the plurality of scan voltages S1 to Sn has the scan-on voltage Vson, the plurality of data voltages D1 to Dm transferred to the pixel electrode PE may be decreased. When the common voltage Vcom in the negative polarity state is higher than the common voltage Vcom in the positive polarity state, the difference between the maximum voltage of the plurality of date voltages D1 to Dm in the positive polarity state and the minimum voltage of the plurality of date voltages D1 to Dm in the negative polarity state may be decreased in comparison to a case where the common voltage Vcom is constant. Accordingly, in an exemplary embodiment, the power consumption of the liquid crystal display device 100 is reduced by decreasing the driving range of the plurality of data voltages D1 to Dm.

The common voltage Vcom may be varied between two adjacent scan periods SP. In an exemplary embodiment, as shown in FIG. 3, a time point when the common voltage Vcom is changed from the first common voltage Vcom1 to the second common voltage Vcom2 or the common voltage Vcom is changed from the second common voltage Vcom2 to the first common voltage Vcom1 may be positioned between the two adjacent scan periods SP. When the common voltage Vcom is varied between the two adjacent scan periods SP, a flicker phenomenon, which may occur due to the change of the common voltage Vcom while the image of one frame is sequentially displayed on the plurality of pixels PX in the first direction d1, may be effectively prevented, and thus the display quality of the liquid crystal display device 100 may be improved.

Figure 4:
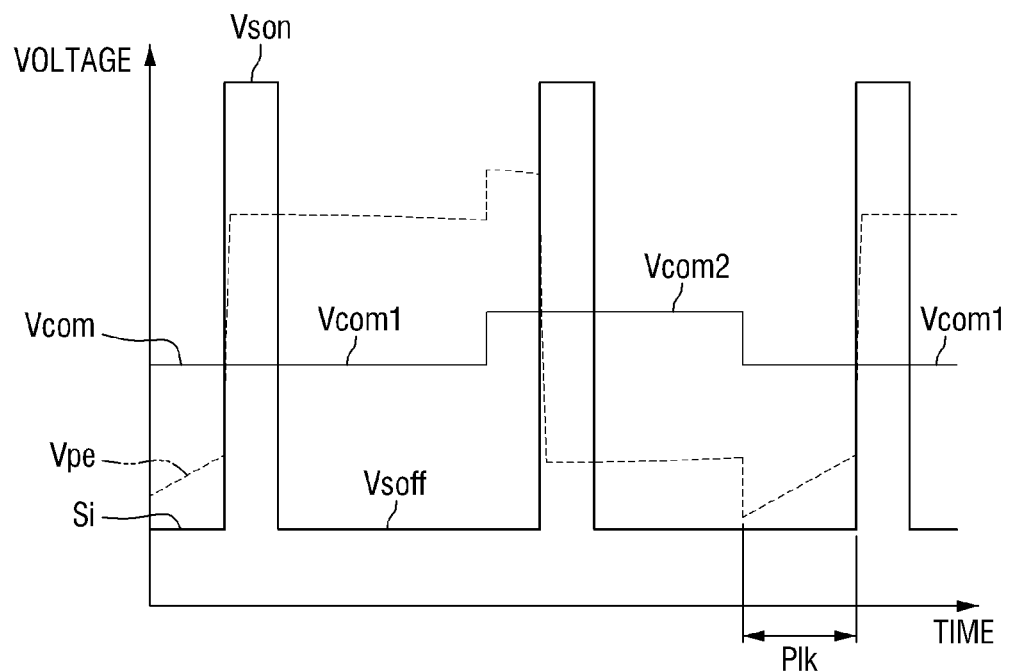
FIG. 4 is a graph of voltage versus time in the i-th scan signal, a pixel voltage, and a common voltage of an exemplary embodiment of a liquid crystal display device, according to the invention.

Hereinafter, referring to FIG. 4, the operation of the pixel PX will be described in greater detail. FIG. 4 is a graph of voltage versus time, illustrating the changes of the i-th scan signal, the pixel voltage and the common voltage. In FIG. 4, the pixel voltage Vpe may be a voltage of a pixel electrode PE included in the pixel PX that receives the i-th scan signal S1 transferred through the i-th scan signal line SLi. When the i-th scan signal S1 has the scan-on voltage Vson, the pixel voltage Vpe may be charged as one of the plurality of data voltages D1 to Dm transferred through the thin film transistor TR. If the i-th scan signal S1 is changed from the scan-on voltage Vson to the scan-off voltage Vsoff, the pixel voltage Vpe may be changed to be close to the common voltage Vcom through the discharge of the liquid crystal capacitor Clc. If the common voltage Vcom is varied, the pixel voltage Vpe may be varied correspondingly. In one exemplary embodiment, for example, when the common voltage Vcom is varied from the first common voltage Vcom1 to the second common voltage Vcom2, as shown in FIG. 4, the pixel voltage Vpe may be increased, while the pixel voltage Vpe may be decreased when the common voltage Vcom is varied from the second common voltage Vcom2 to the first common voltage Vcom1. If the pixel voltage Vpe is decreased when the common voltage Vcom is varied from the second common voltage Vcom2 to the first common voltage Vcom1, the difference between the pixel voltage Vpe and the scan-off voltage Vsoff may be decreased. If the difference between the pixel voltage Vpe and the scan-off voltage Vsoff is decreased, the difference between the voltage of the gate G and the voltage of the source S of the thin film transistor TR may be decreased, and thus the thin film transistor TR may not be completely turned off such that leakage current may occur between the source S and the drain D of the thin film transistor TR. If the leakage current occurs, the pixel voltage Vpe may be quickly changed to the common voltage Vcom in comparison to a case where the leakage current does not occur. The period when the pixel voltage Vpe is quickly changed due to the leakage current may be referred to as a leakage period Plk. In the normally black type liquid crystal panel 10, the difference between the common voltage Vcom and the pixel voltage Vpe is continuously decreased during the leakage period Plk, and thus the light transmittance of the liquid crystal layer included in each of the plurality of pixels PX may be decreased. The leakage period Plk may be defined as a period between a time point when the common voltage Vcom is changed and a time point when the i-th scan signal S1 has the scan-on voltage Vson. In such an embodiment, since the first to n-th scan signals S1 to Sn sequentially have the scan-on voltage Vson along the first direction d1, the length of the leakage period Plk of each of the plurality of pixels PX, which receive one of the first to n-th scan signals S1 to Sn, is gradually increased along the first direction d1. Accordingly, the length of the leakage period Plk of the plurality of pixels PX included in the liquid crystal panel 10 may be gradually increased along the first direction d1, and thus the light transmittance of the liquid crystal layer included in the liquid crystal panel may be gradually decreased along the first direction d1. In such an embodiment, when the liquid crystal display device 100 displays an image having uniform gradation, the light transmittance of the liquid crystal panel 10 may be gradually decreased along the first direction d1. According to an exemplary embodiment of the liquid crystal display device 100, the non-uniformity of the light transmittance of the liquid crystal panel 10 due to the leakage current is compensated through gradual increase of the luminance of the backlight from the backlight unit 50 along the first direction d1, and thus the display quality may be effectively prevented from being deteriorated. Hereinafter, such a gradual increase of the luminance of the backlight will be described in more detail with reference to FIG. 5.

Figure 5:
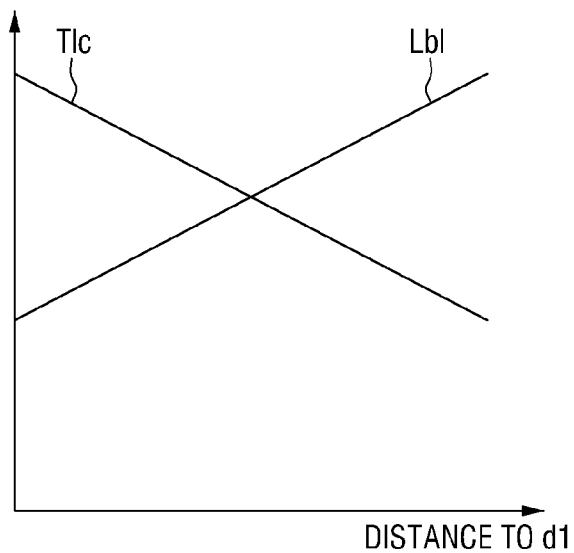
FIG. 5 is a graph illustrating transmittance of a liquid crystal panel and luminance of a backlight according to a distance in a first direction.

FIG. 5 is a graph illustrating the transmittance of the liquid crystal panel and the luminance of the backlight according to displacement in the first direction. Referring to FIG. 5, the light transmittance Tlc of the liquid crystal panel 10 may be gradually decreased along the first direction d1 due to the occurrence of the leakage current by the change of the common voltage Vcom as described above. In an exemplary embodiment, as shown in FIG. 5, the luminance Lbl of the backlight may be gradually increased along the first direction d1. The luminance Lbl of the backlight may be increased to correspond to the decreased of the light transmittance Tlc of the liquid crystal panel 10. The liquid crystal display device 100 may increase the luminance Lbl of the backlight to correspond to the decrease of the light transmittance Tlc of the liquid crystal panel 10, such that the deterioration of the display quality is effectively prevented and the luminance of the liquid crystal display device 100 may be substantially uniform. In an exemplary embodiment, as shown in FIG. 5, the light transmittance Tlc of the liquid crystal panel 10 and the luminance Lbl of the backlight are linearly changed, but not being limited thereto. In an alternative exemplary embodiment, the light transmittance Tlc of the liquid crystal panel 10 and the luminance Lbl of the backlight may be changed in various manners.

Figure 6:
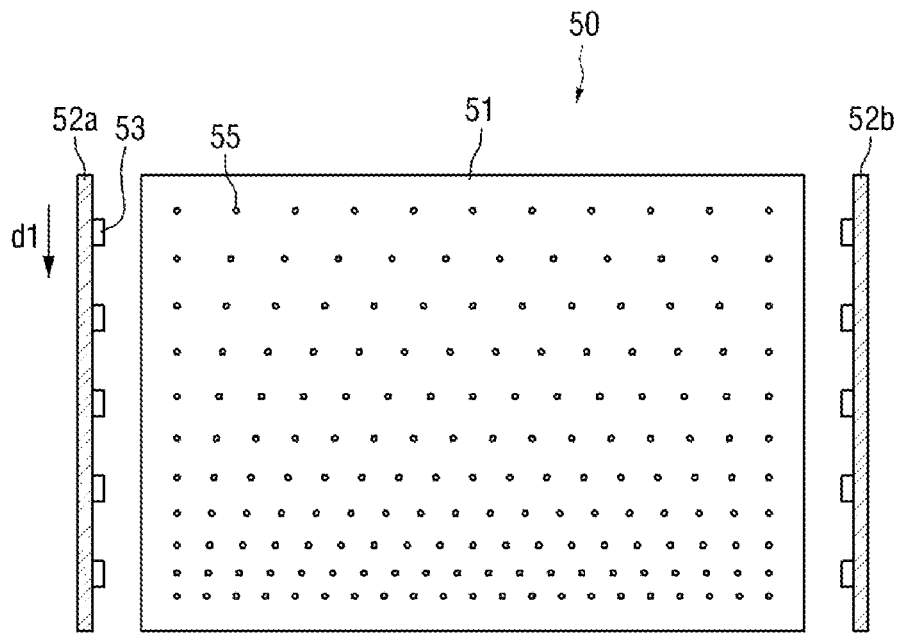
FIG. 6 is a plan view of an exemplary embodiment of a backlight unit of FIG. 1.

Hereinafter, referring to FIG. 6, an exemplary embodiment of the backlight unit 50 will be described in detail. FIG. 6 is a plan view of an exemplary embodiment of the backlight unit in FIG. 1. Referring to FIG. 6, an exemplary embodiment of the backlight unit 50 may include a light guide plate 51 and a plurality of light sources 53.

In such an embodiment, the light guide plate 51 may be arranged on the lower portion of the liquid crystal panel 10 to overlap the liquid crystal panel 10. The light guide plate 51 may guide light emitted from the plurality of light sources 53 to provide the backlight to the liquid crystal panel 10. The light guide plate 51 may include a plurality of diffusion patterns 55. The diffusion pattern may be in the shape of a projection pattern, a curved pattern, or an uneven pattern, for example. The diffusion pattern 55 may facilitate upward emission of the light in the light guide plate 51, that is, an emission of the light toward the liquid crystal panel 10. Accordingly, the luminance of the backlight from a portion of the light guide plate 51 where a density of the diffusion patterns 55 are high may be higher than the luminance of the backlight from a portion of the light guide plate 51 where the density of the diffusion patterns 55 are low. According to an exemplary embodiment of the invention, as shown in FIG. 6, the density of the diffusion patterns 55 may be gradually increased along the first direction d1. Accordingly, the luminance Lbl of the backlight may be increased gradually along the first direction d1, and thus the non-uniformity of the light transmittance of the liquid crystal panel 10 due to the leakage current may be compensated such that the deterioration of the display quality is effectively prevented.

The plurality of light sources 53 may emit and provide light to the light guide plate 51. In an exemplary embodiment, as shown in FIG. 6, the plurality of light sources 53 are arranged adjacent to two sides of the light guide plate 51, but are not limited thereto. In an alternative exemplary embodiment, the plurality of light sources 53 may be arranged along one side of the light guide plate 53 or may be arranged along two or more sides of the light guide plate 53. In an exemplary embodiment, the light source 53 may be a point light source, such as an light emitting diode ("LED"), for example, but is not limited thereto. In an alternative exemplary embodiment, the light source 53 may be a line light source, such as a cold cathode fluorescent lamp, for example. In an exemplary embodiment, where the light source 53 is a ling light source, the backlight unit 53 may include only a single light source 53. In an exemplary embodiment, the plurality of light sources 53 may be arranged along the first direction d1 with a substantially constant pitch. The light emitted from the plurality of light sources 53 may have substantially the same luminance as each other.

The backlight unit 50 may include substrates 52a and 52b. The substrates 52a and 52b may support the plurality of light sources 53, and may include wirings for providing power to the plurality of light sources and for transferring signals to control the plurality of light sources 53.

Referring back to FIG. 1, the liquid crystal display device 100 may further include a timing controller 20, a scan driving unit 30, a data driving unit 40 and a voltage generating unit 60.

In an exemplary embodiment, the timing controller 20 may receive image signals R, G and B corresponding to an image to be displayed on the liquid crystal panel 10 from an outside, and may generate a data driving unit control signal DCS and a scan driving unit control signal SCS. In such an embodiment, the timing controller 20 may generate a voltage generating unit control signal VCS for controlling the voltage generating unit 60.

The scan driving unit 30 may generate and provide the plurality of scan signals S1 to Sn to the liquid crystal panel 10 based on the scan driving unit control signal SCS.

The data driving unit 40 may generate and provide the plurality of data signals D1 to Dm to the liquid crystal panel 10 based on the data driving unit control signal DCS. The plurality of data signal D1 to Dm may be signals including information on gradations of the plurality of pixels PX corresponding to an image to be displayed on the liquid crystal panel 10.

The voltage generating unit 60 may generate and provide the common voltage Vcom to the liquid crystal panel 10. The voltage generating unit 60 may control, e.g., changes, the common voltage Vcom based on the voltage generating unit control signal VCS.

Figure 7:
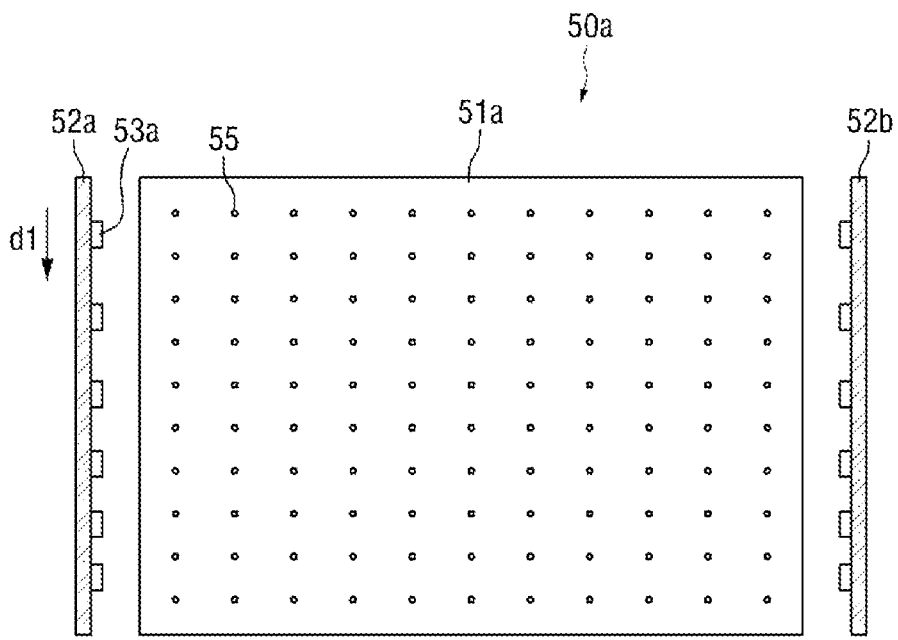
FIG. 7 is a plan view of an alternative exemplary embodiment of a backlight unit, according to the invention.

Hereinafter, referring to FIG. 7, an alternative exemplary embodiment of a backlight unit, according to the invention, will be described. FIG. 7 is a plan view of an alternative exemplary embodiment of a backlight unit, according to the invention.

The backlight unit in FIG. 7 is substantially the same as the backlight unit shown in FIG. 6 except for the light sources and the diffusion patterns. The same or like elements shown in FIG. 7 have been labeled with the same reference characters as used above to describe the exemplary embodiments of the backlight unit shown in FIG. 6, and any repetitive detailed description thereof will hereinafter be omitted or simplified.

Referring to FIG. 7, an alternative exemplary embodiment of a backlight unit 50a may include a light guide plate 51a, a plurality of light sources 53a, and substrates 52a and 52b. The plurality of light sources 53a may be arranged with a pitch that is gradually decreased along the first direction d1. In such an embodiment, the pitch of the plurality of light sources 53a is gradually decreased along the first direction d1, such that the luminance Lbl of the backlight may be gradually increased along the first direction d1. In such an embodiment, the luminance Lbl of the backlight is gradually increased along the first direction d1, such that the non-uniformity of the light transmittance of the liquid crystal panel 10, which is due to the leakage current, is compensated, and thus the display quality may be effectively prevented from being deteriorated. The light emitted from the plurality of light sources 53a may have substantially the same luminance as each other. The light guide plate 51a may include a plurality of diffusion patterns 55, and the density of the diffusion patterns 55 in the light guide plate 51 may be substantially uniform.

Figure 8:
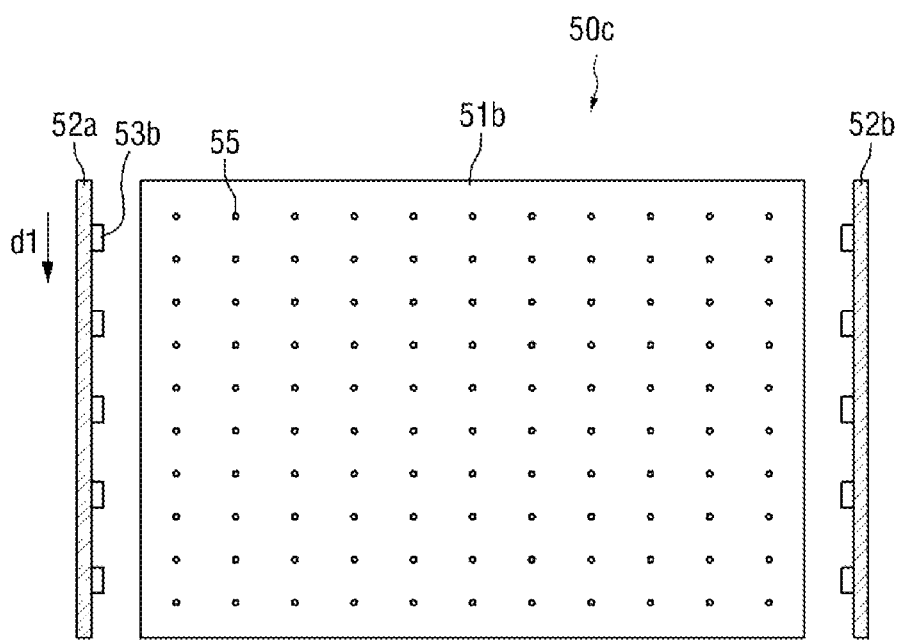
FIG. 8 is a plan view of another alternative exemplary embodiment of a backlight unit, according to the invention.

Hereinafter, referring to FIG. 8, another alternative exemplary embodiment of a backlight unit, according to the invention, will be described. FIG. 8 is a plan view of another alternative exemplary embodiment of a backlight unit, according to the invention.

The backlight unit in FIG. 8 is substantially the same as the backlight unit shown in FIG. 6 except for the light sources and the diffusion patterns. The same or like elements shown in FIG. 8 have been labeled with the same reference characters as used above to describe the exemplary embodiments of the backlight unit shown in FIG. 6, and any repetitive detailed description thereof will hereinafter be omitted or simplified.

Referring to FIG. 8, an exemplary embodiment of a backlight unit 50c may include a light guide plate 51b, a plurality of light sources 53b, and substrates 52a and 52b. In such an embodiment, the luminance of the light provided from the plurality of light sources 53b may be gradually increased along the first direction d1. In such an embodiment, where the luminance of the plurality of light sources 53b is gradually increased along the first direction d1, the luminance Lbl of the backlight may be gradually increased along the first direction d1, such that the non-uniformity of the light transmittance of the liquid crystal panel 10, which is due to the leakage current, is compensated. Accordingly, in such an embodiment, the display quality can be prevented from being deteriorated. The plurality of light sources 53b may be arranged in the first direction with a substantially constant pitch.

Figure 9:
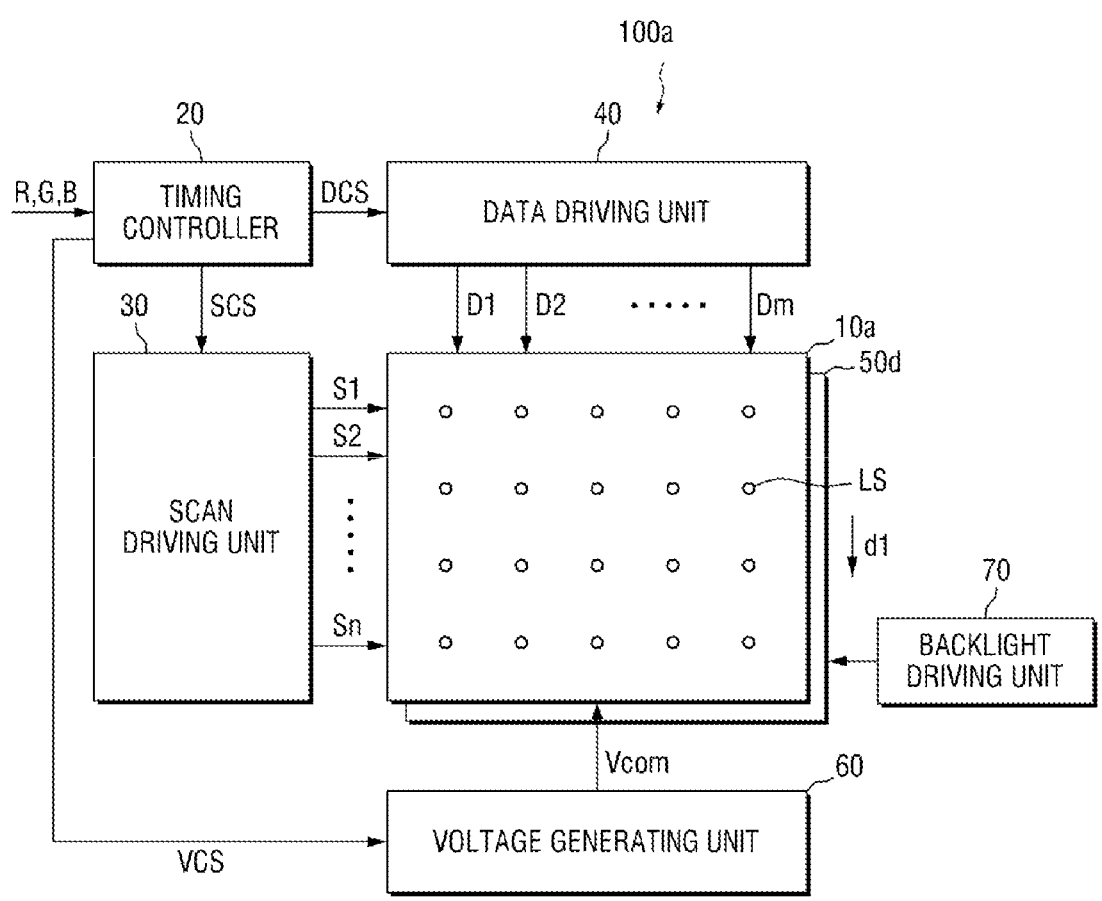
FIG. 9 is a block diagram showing an alternative exemplary embodiment of a liquid crystal display device, according to the invention.

Hereinafter, referring to FIG. 9, an alternative exemplary embodiment of a liquid crystal display device, according to the invention, will be described. FIG. 9 is a block diagram illustrating an alternative exemplary embodiment of a liquid crystal display device, according to the invention.

The liquid crystal display device in FIG. 9 is substantially the same as the liquid crystal display device shown in FIG. 1 except for detecting sensors and a backlight driving unit. The same or like elements shown in FIG. 9 have been labeled with the same reference characters as used above to describe the exemplary embodiments of the liquid crystal display device shown in FIG. 1, and any repetitive detailed description thereof will hereinafter be omitted or simplified.

As shown in FIG. 9, an exemplary embodiment of a liquid crystal display device 100a may include a liquid crystal panel 10a, a backlight unit 50d, a backlight driving unit 70, a timing controller 20, a data driving unit 40, a scan driving unit 30 and a voltage generating unit 60.

Figure 10:
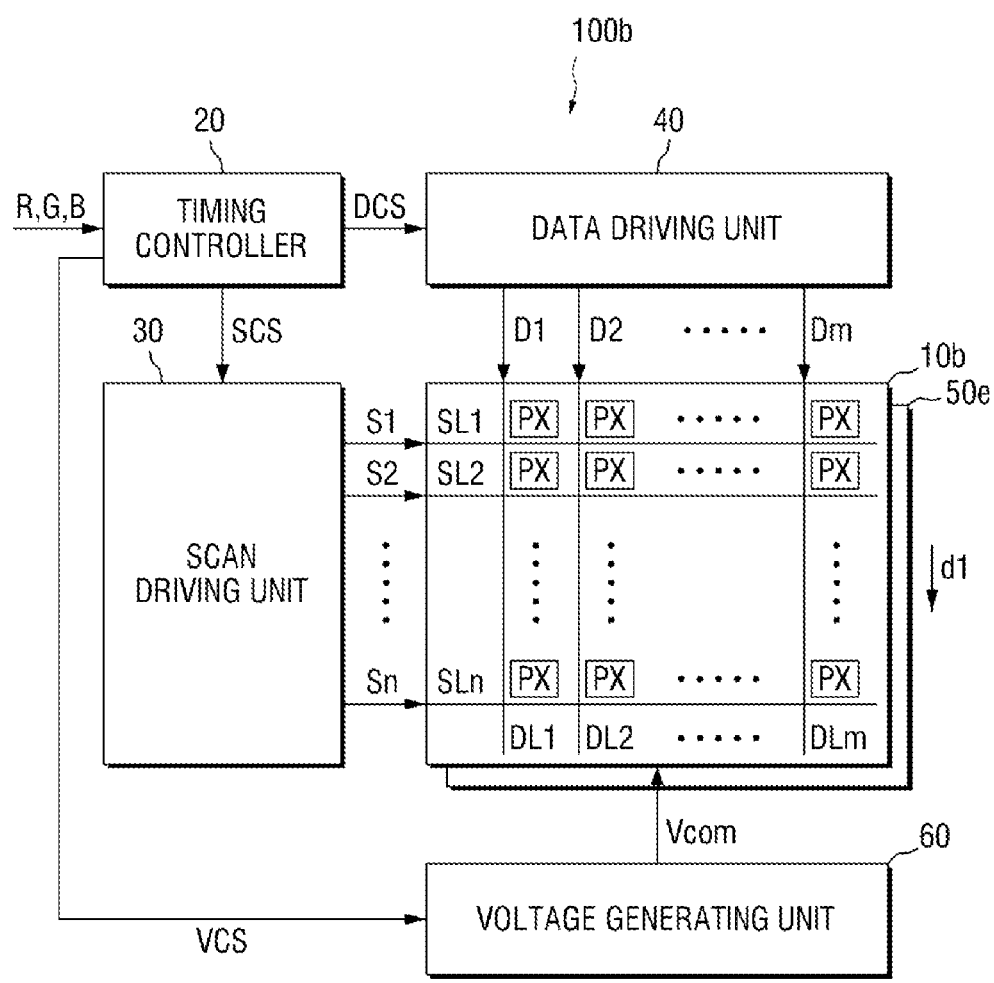
FIG. 10 is a block diagram of a liquid crystal display device according to still another embodiment of the invention.

In an exemplary embodiment, as shown in FIG. 10, the liquid crystal panel 10a may further include a plurality of luminance detecting sensors LS. The plurality of luminance detecting sensors LS may be arranged substantially uniformly on the liquid crystal panel 10a, and may detect the luminance of an image that is displayed on the liquid crystal panel 10a to detect the luminance distribution of the liquid crystal panel 10a.

The configuration of the backlight unit 50d shown in FIG. 9 may be substantially the same as the configuration of the backlight unit 50c illustrated in FIG. 8. In such an embodiment shown in FIG. 9, the luminance of the light provided from the plurality of light sources 53b included in the backlight unit 50d may be controlled by the backlight driving unit 70.

The backlight driving unit 70 may control the luminance of the light emitted from the plurality of light sources 53b. The backlight driving unit 70 may control the luminance of the light emitted from the plurality of light sources 53b based on the luminance detected by the plurality of luminance detecting sensors LS.

In such an embodiment, the liquid crystal display device 100a may operate in a correction mode. When the liquid crystal display device 100a is in the correction mode, the liquid crystal display device 100a may display the image corresponding to image data R, B and B having uniform gradation, and may detect the luminance of the image displayed on the liquid crystal panel 10a to detect the luminance distribution of the liquid crystal panel 10a. The backlight driving unit 70 may control the luminance of the light emitted from the plurality of light sources 53b based on the luminance distribution of the liquid crystal display device 10a that is detected by the plurality of luminance detecting sensors LS such that the luminance distribution of the liquid crystal panel 10a becomes substantially uniform.

When the luminance distribution of the backlight emitted from the backlight unit 50d is set corresponding to the non-uniformity of the light transmittance of the liquid crystal panel 10a due to the leakage current in an initial stage of completion of the liquid crystal display device 100a, the characteristic of the light transmittance of the liquid crystal panel 10a and the characteristic of the backlight unit 50d may be changed with the lapse of time, and thus the non-uniformity of the luminance of the image that is displayed on the liquid crystal display device 100a may become severe. In such an embodiment, the liquid crystal display device 100a operates in the correction mode, and the luminance distribution of the backlight may be changed based on the characteristic change of the devices included in the liquid crystal display device 100a with the lapse of time, and thus the luminance of the image that is displayed on the liquid crystal display device 100a may be substantially constantly maintained.

Hereinafter, referring to FIGS. 10 and 11, another alternative exemplary embodiment of a liquid crystal display device, according to the invention, will be described. FIG. 10 is a block diagram illustrating another alternative exemplary embodiment of a liquid crystal display device, according to the invention, and FIG. 11 is a plan view of an exemplary embodiment of a backlight unit in FIG. 10.

The liquid crystal display device in FIG. 10 is substantially the same as the liquid crystal display device shown in FIG. 1 except the liquid crystal panel and the backlight unit. The same or like elements shown in FIG. 10 have been labeled with the same reference characters as used above to describe the exemplary embodiments of the liquid crystal display device shown in FIG. 1, and any repetitive detailed description thereof will hereinafter be omitted or simplified.

Referring to FIG. 10, an exemplary embodiment of a liquid crystal display device 100b may include a liquid crystal panel 10b, a backlight unit 50e, a timing controller 20, a data driving unit 40, a scan driving unit 30 and a voltage generating unit 60.

Figure 11:
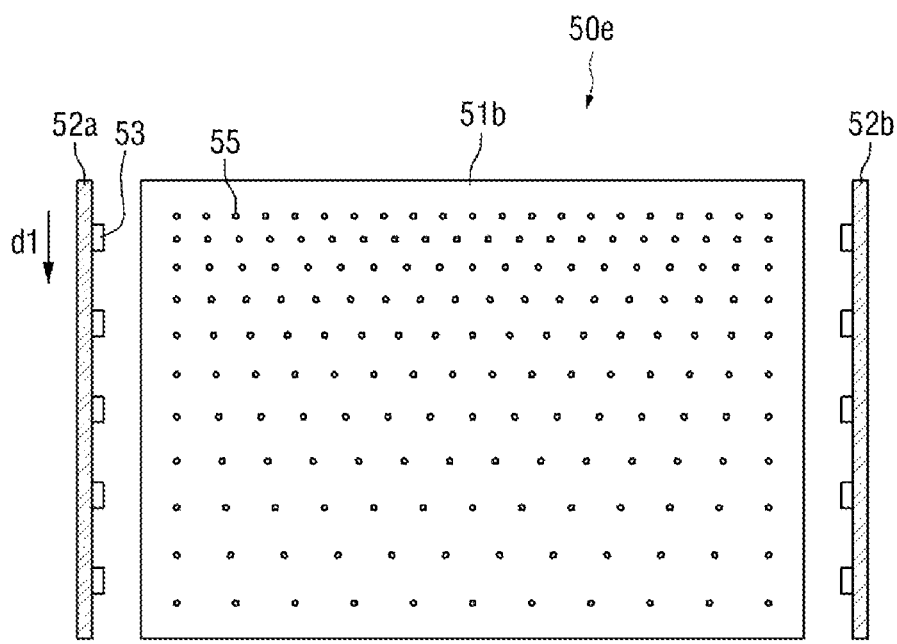
FIG. 11 is a plan view of an exemplary embodiment of a backlight unit of FIG. 10.

In such an embodiment shown in FIGS. 10 and 11, the liquid crystal panel 10b is of a normally white type. In such an embodiment, where the liquid crystal panel 10b is of a normally white type, the liquid crystal panel 10b has the maximum light transmittance when the electric field is not applied to the liquid crystal layer. Accordingly, as the length of the leakage period Plk is increased, the light transmittance may be increased. Since the length of the leakage period Plk is gradually increased along the first direction d1 in the liquid crystal panel 10b, the light transmittance of the liquid crystal panel 10b may be gradually increased along the first direction d1.

In such an embodiment, the luminance of the backlight emitted from the backlight unit 50e is decreased along the first direction d1. In such an embodiment, where the luminance of the backlight is decreased along the first direction d1, the increase of the light transmittance of the liquid crystal panel 10b along the first direction d1 may be thereby compensated, and thus the luminance of the liquid crystal display device 100b becomes substantially uniform to effectively prevent the deterioration of the display quality.

Hereinafter, referring to FIG. 11, an exemplary embodiment of the backlight unit 50e of the liquid crystal display device 100b shown in FIG. 10 will be described in detail. As shown in FIG. 11, an exemplary embodiment of the backlight unit 50e may include a light guide plate 51b, a plurality of light sources 53, and substrates 52a and 52b.

The light guide plate 51b may include a plurality of diffusion patterns 55. In such an embodiment, the density of the diffusion patterns 55 may be gradually decreased along the first direction d1, such that the luminance Lbl of the backlight may be decreased gradually along the first direction d1, and thus the non-uniformity of the light transmittance of the liquid crystal panel 10b that is due to the leakage current may be compensated to prevent the deterioration of the display quality.

Figure 12:
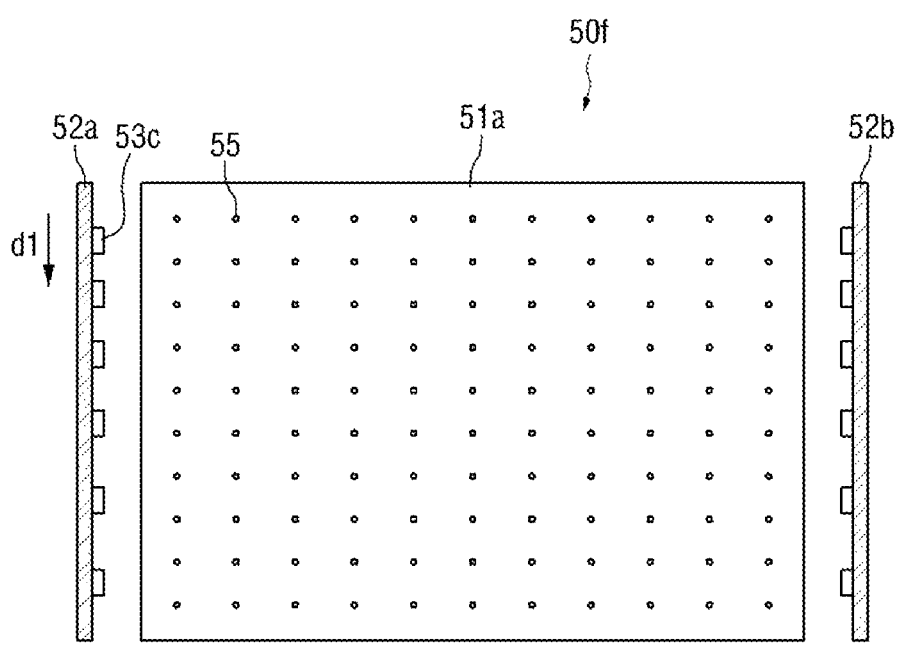
FIG. 12 is a plan view of an alternative exemplary embodiment of a backlight unit, according to the invention.

Hereinafter, referring to FIG. 12, an alternative exemplary embodiment of a backlight unit of FIG. 10 will be described. FIG. 12 is a plan view of an alternative exemplary embodiment of a backlight unit of FIG. 10.

The backlight unit in FIG. 12 is substantially the same as the backlight unit shown in FIG. 11 except for the light sources and the diffusion patterns. The same or like elements shown in FIG. 12 have been labeled with the same reference characters as used above to describe the exemplary embodiments of the backlight unit shown in FIG. 11, and any repetitive detailed description thereof will hereinafter be omitted or simplified.

Referring to FIG. 12, an exemplary embodiment of a backlight unit 50f may include a light guide plate 51a, a plurality of light sources 53c, and substrates 52a and 52b. The plurality of light sources 53c may be arranged with a pitch that is gradually increased along the first direction d1. In such an embodiment, where the pitch of the plurality of light sources 53c is gradually increased along the first direction d1, the luminance Lbl of the backlight may be gradually decreased along the first direction d1, such that the non-uniformity of the light transmittance of the liquid crystal panel 10b, which is due to the leakage current, is compensated, and thus the display quality may be effectively prevented from being deteriorated. In such an embodiment, the light emitted from the plurality of light sources 53a may have substantially the same luminance as each other.

Figure 13:
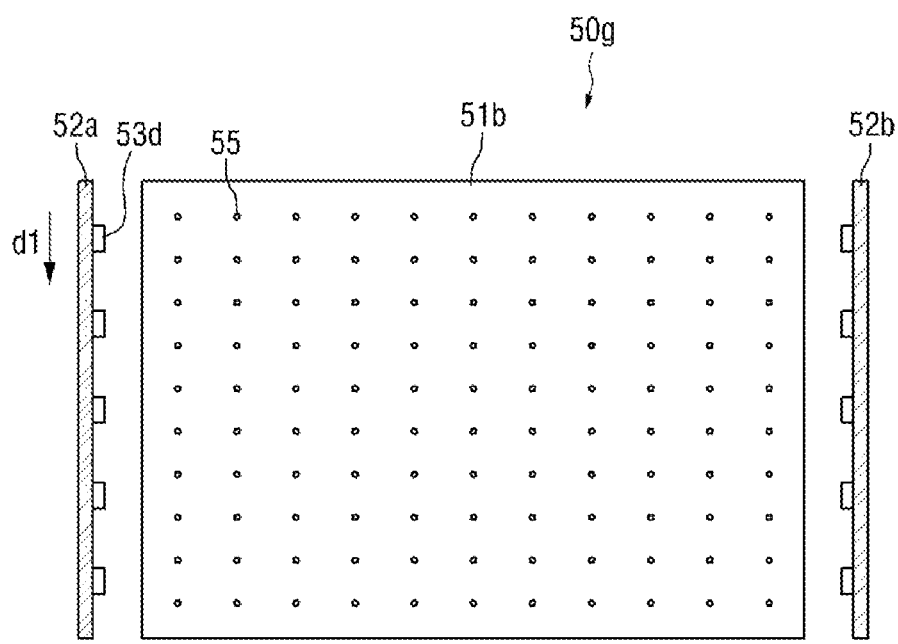
FIG. 13 is a plan view of another alternative exemplary embodiment of a backlight unit, according to the invention.

Hereinafter, referring to FIG. 13, another alternative exemplary embodiment of a backlight unit will be described. FIG. 13 is a plan view illustrating another alternative exemplary embodiment of a backlight unit, according to the invention.

The backlight unit in FIG. 13 is substantially the same as the backlight unit shown in FIG. 11 except for the light sources and the diffusion patterns. The same or like elements shown in FIG. 13 have been labeled with the same reference characters as used above to describe the exemplary embodiments of the backlight unit shown in FIG. 11, and any repetitive detailed description thereof will hereinafter be omitted or simplified.

Referring to FIG. 13, an exemplary embodiment of a backlight unit 50g may include a light guide plate 51b, a plurality of light sources 53d, and substrates 52a and 52b. In such an embodiment, the luminance of the light provided from the plurality of light sources 53d may be gradually increased along the first direction d1. In such an embodiment, where the luminance of the plurality of light sources 53d is gradually increased along the first direction d1, the luminance Lbl of the backlight may be gradually decreased along the first direction d1. If the luminance Lbl of the backlight is gradually decreased along the first direction d1 such that the non-uniformity of the light transmittance of the liquid crystal panel 10b, which is due to the leakage current, is compensated, and thus the display quality may be prevented from being deteriorated. In such an embodiment, the plurality of light sources 53d may be arranged in the first direction d1 with a substantially uniform pitch.

Figure 14:
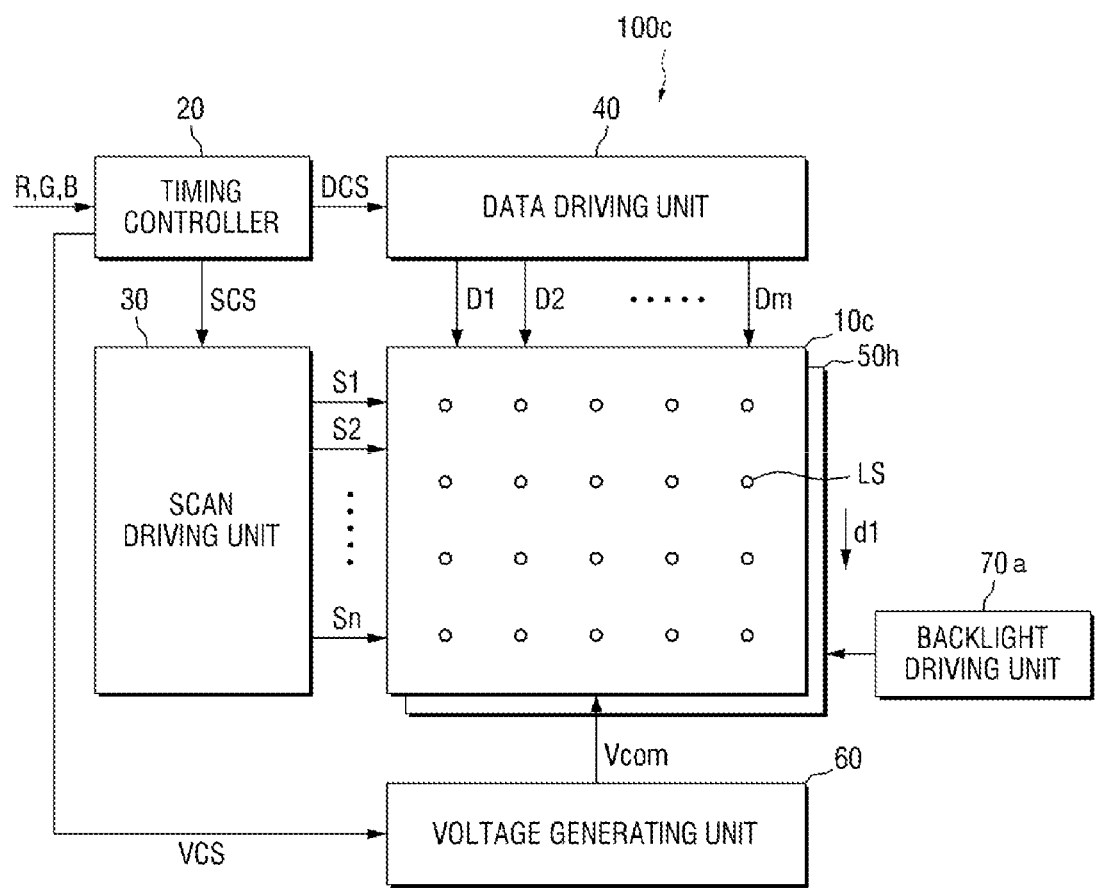
FIG. 14 is a block diagram showing another alternative exemplary embodiment of a liquid crystal display device according to still another embodiment of the invention.

Hereinafter, referring to FIG. 14, another alternative exemplary embodiment of a liquid crystal display device will be described. FIG. 14 is a block diagram illustrating another alternative exemplary embodiment of a liquid crystal display device, according to the invention.

The liquid crystal display device in FIG. 14 is substantially the same as the liquid crystal display device shown in FIG. 9 except for detecting sensors and a backlight driving unit. The same or like elements shown in FIG. 14 have been labeled with the same reference characters as used above to describe the exemplary embodiments of the liquid crystal display device shown in FIG. 9, and any repetitive detailed description thereof will hereinafter be omitted or simplified.

In an exemplary embodiment, as shown in FIG. 14, a liquid crystal display device 100c may include a liquid crystal panel 10c, a backlight unit 50h, a backlight driving unit 70a, a timing controller 20, a data driving unit 40, a scan driving unit 30, and a voltage generating unit 60.

In such an embodiment, the liquid crystal panel 10c may further include a plurality of luminance detecting sensors LS. The plurality of luminance detecting sensors LS may be arranged substantially uniformly on the liquid crystal panel 10c, and may detect the luminance of an image that is displayed on the liquid crystal panel 10c to detect the luminance distribution of the liquid crystal panel 10c.

The configuration of the backlight unit 50h of the liquid crystal display device 100c shown in FIG. 14 may be substantially the same as the configuration of the backlight unit 50g illustrated in FIG. 13, except that the luminance of the light provided from the plurality of light sources 53d in the backlight unit 50h of the liquid crystal display device 100c shown in FIG. 14 may be controlled by the backlight driving unit 70a.

The backlight driving unit 70a may control the luminance of the light emitted from the plurality of light sources 53d. The backlight driving unit 70a may control the luminance of the light emitted from the plurality of light sources 53d based on the luminance detected by the plurality of luminance detecting sensors LS.

In such an embodiment, the liquid crystal display device 100c may operate in a correction mode. In such an embodiment, when the liquid crystal display device 100c is in the correction mode, the liquid crystal display device 100c may display the image corresponding to image data R, B and B having uniform gradation, and may detect the luminance of the image that is displayed on the liquid crystal panel 10c to detect the luminance distribution of the liquid crystal panel 10c. The backlight driving unit 70a may control the luminance of the light emitted from the plurality of light sources 53d based on the luminance distribution of the liquid crystal display device 10c that is detected by the plurality of luminance detecting sensors LS such that the luminance distribution of the liquid crystal panel 10c becomes substantially uniform.

When the luminance distribution of the backlight emitted from the backlight unit 50h is set based on the non-uniformity of the light transmittance of the liquid crystal panel 10c due to the leakage current in an initial stage of completion of the liquid crystal display device 100c, the characteristic of the light transmittance of the liquid crystal panel 10c and the characteristic of the backlight unit 50h may be changed with the lapse of time, and thus the non-uniformity of the luminance of the image that is displayed on the liquid crystal display device 100c may become severe. In an exemplary embodiment, the liquid crystal display device 100c operates in the correction mode, such that the luminance distribution of the backlight may be controlled to compensate the characteristic change of the devices included in the liquid crystal display device 100c in process of time, and thus the luminance of the image that is displayed on the liquid crystal display device 100c may be effectively uniformly maintained.

The invention should not be construed as being limited to the exemplary embodiments set forth herein. Rather, these exemplary embodiments are provided so that this disclosure will be thorough and complete and will fully convey the concept of the present invention to those skilled in the art.

While the invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A liquid crystal display device comprising:
a liquid crystal panel of a normally black type which receives a plurality of scan signals and receives a common voltage having a voltage level, which periodically varies; and
a backlight unit which provides backlight to the liquid crystal panel,
wherein
the plurality of scan signals sequentially has a scan-on voltage along a first direction,
a first period when the plurality of scan signals sequentially has the scan-on voltage once in the first direction is defined as a scan period,
the voltage level of the common voltage increases or decreases during a second period between first scan period and a second scan period after the first scan period and during a third period between the second scan period and a third scan period after the second scan period,
the backlight has a luminance which is increased along the first direction during the third period, and
the luminance of the backlight does not increase along the first direction during at least one of the first scan period, the second period and the second scan period.

2. The liquid crystal display device of claim 1, wherein the backlight unit comprises:
a light source which emits light; and
a light guide plate which guides the light from the light source,
wherein
the light guide plate comprises a plurality of diffusion patterns arranged on a surface thereof, and
a density of the plurality of diffusion patterns is increased along the first direction.

3. The liquid crystal display device of claim 1, wherein the backlight unit comprises:
a plurality of light sources which emits light; and
a light guide plate which guides the light from the light sources,
wherein
the plurality of light sources is arranged along the first direction, and
a pitch of the plurality of light sources is decreased along the first direction.

4. The liquid crystal display device of claim 3, wherein the light emitted from the plurality of light sources has substantially the same luminance as each other.

5. The liquid crystal display device of claim 1, wherein the backlight unit comprises:
a plurality of light sources which emits light; and
a light guide plate which guides the light from the light sources,
wherein luminance of the light emitted from the plurality of light sources is increased along the first direction.

6. The liquid crystal display device of claim 1, wherein the backlight unit comprises:
a plurality of light sources which emits light;
a light guide plate which guides the light from the light sources; and
a backlight driving unit which controls luminance of the light emitted from the plurality of light sources,
wherein the liquid crystal panel comprises a plurality of luminance detecting sensors.

7. The liquid crystal display device of claim 6, wherein the liquid crystal display device operates in a correction mode, and
when the liquid crystal display device operates in the correction mode, an image corresponding to image data having uniform gradation is displayed on the liquid crystal panel, and the backlight driving unit controls the luminance of the plurality of light sources based on the luminance detected by the plurality of luminance detecting sensors such that the image displayed on the liquid crystal panel has substantially uniform luminance.

8. The liquid crystal display device of claim 1, wherein the liquid crystal panel operates under a polarity inversion driving, and
the voltage level of the common voltage for a negative polarity is higher than the voltage level of the common voltage for a positive polarity.

9. The liquid crystal display device of claim 1, wherein the liquid crystal panel comprises:
a pixel electrode to which a data voltage corresponding to an image to be displayed on the liquid crystal panel is applied; and
a common electrode to which the common voltage is applied,
wherein the voltage level of the common voltage when the data voltage is lower than the common voltage is higher than the voltage level of the common voltage when the data voltage is higher than the common voltage.

* * * * *